United States Patent
Fleischmann et al.

(10) Patent No.: US 9,254,966 B2
(45) Date of Patent: Feb. 9, 2016

(54) MONITORING AND CONTROL OF A TRANSPORT DEVICE FOR CONTAINERS

(71) Applicant: KRONES AG, Neutraubling (DE)

(72) Inventors: Bernd Fleischmann, Regensburg (DE); Martin Seger, Neumarkt i.d. Opf (DE)

(73) Assignee: KRONES AG, Neutraubling (DE)

( * ) Notice: Subject to any disclaimer, the term of this patent is extended or adjusted under 35 U.S.C. 154(b) by 12 days.

(21) Appl. No.: 14/259,613

(22) Filed: Apr. 23, 2014

(65) Prior Publication Data

US 2014/0350719 A1 Nov. 27, 2014

(30) Foreign Application Priority Data

May 21, 2013 (DE) .................. 10 2013 209 362

(51) Int. Cl.
*G06F 7/00* (2006.01)
*B65G 43/08* (2006.01)
*B65G 43/10* (2006.01)

(52) U.S. Cl.
CPC ................ *B65G 43/08* (2013.01); *B65G 43/10* (2013.01)

(58) Field of Classification Search
None
See application file for complete search history.

(56) References Cited

U.S. PATENT DOCUMENTS

| 3,987,429 A | 10/1976 | Manduley et al. | |
| 4,557,301 A * | 12/1985 | Jörss .................. | B65B 3/26 141/102 |
| 4,895,643 A * | 1/1990 | Hippenmeyer ...... | B65G 47/506 209/552 |

FOREIGN PATENT DOCUMENTS

| CN | 1181826 A | 5/1998 |
|---|---|---|
| CN | 101875440 A | 11/2010 |
| CN | 102020103 A | 4/2011 |
| DE | 3313030 A * | 10/1984 |
| DE | 3313030 A1 | 10/1984 |
| DE | 4434716 A1 * | 3/1995 |
| DE | 4434176 A1 | 3/1996 |
| EP | 0066119 A1 | 12/1982 |
| EP | 0110189 A1 | 6/1984 |
| EP | 0190090 A1 | 8/1986 |
| EP | 0071955 B1 | 9/1986 |
| EP | 0270133 A2 | 6/1988 |
| EP | 0166394 B1 | 4/1989 |

OTHER PUBLICATIONS

Search Report for DE 10 2013 209 362.4, filed May 8, 2014.
European Search Report for Application No. EP14162551, dated Sep. 5, 2014.
Office Action and Search Report for Chinese Application No. 201410217248.3 dated Nov. 2, 2015.

* cited by examiner

*Primary Examiner* — Yolanda Cumbess
(74) *Attorney, Agent, or Firm* — Marshall, Gerstein & Borun LLP

(57) ABSTRACT

Method for monitoring and controlling a loading rate of a transport section with one or several individually speed-controlled consecutive partial sections (T1, T2, T3) in a filling line, including detecting a container loading over a certain region at an incoming region (E1) of the transport section; simulating a container flow in real time using the detected container loading in the incoming region of the transport section and a transport speed, the simulation including: entering the detected value for the container loading into a shift register (SR1); and synchronizing a shift register clock with the transport speed, so that the shift register content (DW0, DW1, . . . ) represents the container loading on the transport section.

15 Claims, 3 Drawing Sheets

MONITORING AND CONTROL OF A TRANSPORT DEVICE FOR CONTAINERS

CROSS-REFERENCE TO RELATED APPLICATION

This application claims priority to German Application No. 10 2013 209 362.4, filed May 21, 2013. The priority application, DE 10 2013 209 362.4, is hereby incorporated by reference.

FIELD OF THE DISCLOSURE

The present disclosure relates generally to a method for monitoring and controlling a loading rate of a transport section for transporting containers, for example in a filling line with one or several individually speed-controlled consecutive partial sections, and in particular, to a method wherein a container loading is detected over a certain region at an incoming region of the transport section.

BACKGROUND

In the beverage industry, a filling line includes, for example, a plurality of container treatment devices which are interconnected by transporters on which containers are transported between the container treatment devices. Such transport sections typically consist of a row of consecutive partial sections in which containers may be accelerated, buffered, singulated or split from a single-track to a multi-track section. To ensure a perfect and efficient transport of the containers on the transport section, the transport section is normally monitored by sensors.

FIG. 1 schematically shows a transport section between two container treatment devices A and B with the partial sections S1, S2, S3, and S4. The speeds of the partial sections S1, S2, S3 and S4 may be individually controlled by associated motors M1, M2, M3, and M4. On sections S1 and S2, for example, the container flow may be decelerated. The partial section S3 functions as a buffer section in which the container flow may be backed up, for example to buffer faults. On partial section S4, the parallel container flow from partial section S3 is singulated again and supplied to the container treatment device B. With sensors 1, 2, 3, and 4, the loading of the partial sections S1, S2, S3, and S4 is detected and fed to a computer unit 5. The computer unit 5 then evaluates the sensor data and controls the speeds of the partial sections S1, S2, S3, and S4 via motors M1, M2, M3, and M4.

Such monitoring and controlling of a transporter is described, for example, in EP-A-0071955. This prior art discloses a method for continuously controlling the transport speed of transporters. EP-A-0071955 suggests a sensor for each partial section which detects the number of bottles and their geometric distribution to realize a bottle tracking method which is used for controlling the transport speed of the transporter such that a high throughput is achieved with minimal back pressures.

A similar example is shown in EP-A-0066119.

EP-A-0190090 describes a device for orienting containers without pressure, wherein containers on a multi-track conveyor path are introduced into a single-track conveyor path. Two sensors are used for controlling the speed of the conveyor paths. A first sensor detects the container loading on the multi-track conveyor path by means of a camera, and a second sensor detects the container loading on the single-track path.

With the methods known from prior art for monitoring and controlling a loading rate of a transport section, the containers may only be tracked with a plurality of sensors. For example, EP-A-0071955 and EP-A-0066119 use four or more sensors. A further disadvantage of said prior art is that the status between the sensors is not detected, and thus a representation of the overall loading of a conveyor path in real time is not possible. Moreover, the great number of sensors involve high amounts of material for the sensors themselves and the corresponding cabling, i. e. the required connections to a central computer or a central control unit, thereby moreover increasing error-proneness. In the prior art document EP-A-0190090 where two sensors are used, one sensor at the start of the transport section and one sensor at the end of the transport section, no container tracking is provided nor even possible. In this prior art, a representation of the loading on the complete transport section in real time is neither possible.

SUMMARY OF THE DISCLOSURE

It is therefore an object of the present invention to provide a method for monitoring and controlling a loading rate of a transport section with as little effort as possible, the method being able to track the containers on a transporter in real time and to represent the loading of the overall transport section in real time, so that an efficient control of the container transport is permitted. As a computer unit, a stored program control (SPC) is preferably used.

The object is in particular achieved by a method according to the type mentioned in the beginning which is characterized by a simulation of the container flow in real time using the detected container loading in the incoming region of the transport section and a transport speed, the simulation comprising: entering the detected value for the container loading into a shift register; and synchronizing a shift register clock with the transport speed, so that the shift register content represents the container loading on the conveyor path. Since the shift register clock is synchronized with the transport speed, each change of the loading is represented in the shift register in real time. Thus, the container throughput may be more efficiently controlled in a simple manner, in particular with a plurality of partial sections disposed one after the other.

In one embodiment, a certain path section on the transport section or the partial transport section is associated with the shift register clock depending on the transport speed. Thus, each register content corresponds to the loading of a certain section on the transport section. Correspondingly, a total container loading of the complete transport section, a container density for certain regions of the transport section, and/or container distances for certain sections or a mean container density for the total transport section may be calculated. By adding the transport speeds of the partial sections, a container throughput may be calculated from the shift register contents. Thus, the transport speeds of the partial sections may be controlled such that a given container throughput, a given container loading, and/or a given container distance are achieved.

In one embodiment, the shift register comprises a plurality of differently clocked shift registers corresponding to the number of partial sections, wherein the clocks of the differently clocked shift registers are synchronized with the transport speeds of the partial sections. Thereby, the shift registers may be interconnected such that they may simulate or represent transport sections with a plurality of individually speed-controlled partial sections.

In one particular embodiment of the present disclosure, a virtual representation of a container loading may be calculated at a transfer point between two adjacent partial transport sections by calculating a virtual position and an arrival time of one or several containers at the transfer point. The virtual representation is transmitted in the form of a register content, i.e. a numerical value for the container loading at the transfer point to a following shift register which is associated with the subsequent partial section of the transport section. This method simulates the transfer of containers between two adjacent transport sections at a transfer point. In particular, the transfer between two transport sections with different speeds may be simulated thereby. The information serve for controlling the transport speeds of the partial sections, so that a gentle transfer from one partial section to following partial sections/individual sections is permitted. Equally, the transport speeds may be controlled such that the containers may be gently backed up or that gaps may be filled gently, that means with as little noise as possible and without damaging the containers, for example bottles.

The simulation of the transfer may be realized, for example, by adding, during the shifting of a last storage cell of a preceding shift register, its storage contents to the storage contents of a first storage cell of a subsequent shift register to simulate a transfer from one partial section to a subsequent partial section.

The register contents of all storage cells of all shift registers may be used for visualizing the loading of the transport section and/or their time-related change, for example by outputting the data in the registers of the shift register to a monitor, for example in the form of a dynamically changing graphic.

The shift register contents may also be used for simulating a virtual back pressure switch. Thereby, all back pressure switches may be dispensed with, thereby reducing the amount of required material and maintenance. For example, a virtual back pressure may be calculated from a container density and the transport speeds of the corresponding partial section and the adjacent partial sections for a certain storage cell corresponding to a certain place on the transport section.

In one embodiment, the virtual back pressure switch may change the transport speed of one or several partial sections directly or via a central control unit, such that the loading density or the virtual back pressure according to a certain storage cell of a certain shift register fall below a predetermined value. Thereby, the transport section may be controlled, for example, to a minimum back pressure or even minimum noise.

To detect errors in the installation or in the electronics, or to realize a closed control loop, the container loading may additionally also be detected over a certain region at an outgoing region of the transport section.

In one embodiment, the container loading is detected cyclically at the incoming region of the transport section over a section which corresponds to the shift register clock. Thus, a new value for the container loading is entered into the shift register in each shift register clock, so that a continuous representation of the transported containers is effected.

As an alternative, the container loading may also be detected continuously, and the continuous data stream is split into partial data packets corresponding to the shift register clock and fed into the shift register. It is also possible to use detection cycles which are shorter than the shift register clock. In this case, a container number may be added up over several detection cycles, or a mean value is formed from several container density values to obtain a loading density for a desired path which corresponds to the shift register clock.

The container loading may be detected, for example, by a camera which also permits to detect multi-track container flows. Advantageously, the loading rate is evaluated by means of a 3D camera, because the detection of contours is less susceptible to external light. Moreover, a conventional camera requires gray-scale detection which always involves problems with the different possible color contrasts. A stereo camera having two objectives, for example with a spatial distance between 40 mm and 150 mm, each recording two single frames synchronously, is particularly advantageous. In case of a single-track partial section, container loading detection may also be performed with a light barrier which may reduce the amount of required apparatuses.

Below, embodiments, further developments, advantages and possible applications of the invention will be illustrated more in detail with reference to the enclosed figures. Here, all described and/or illustrated features by themselves or in any combination are basically the subject matter of the invention, independent of their summary in the claims or their references. Moreover, the contents of the claims are made a part of the description. In the Figures:

The present invention was developed in order to monitor a loading of a transport device for containers, to control the transporter, to detect troubles and to counteract troubles with less efforts than in prior art.

Figure 1:
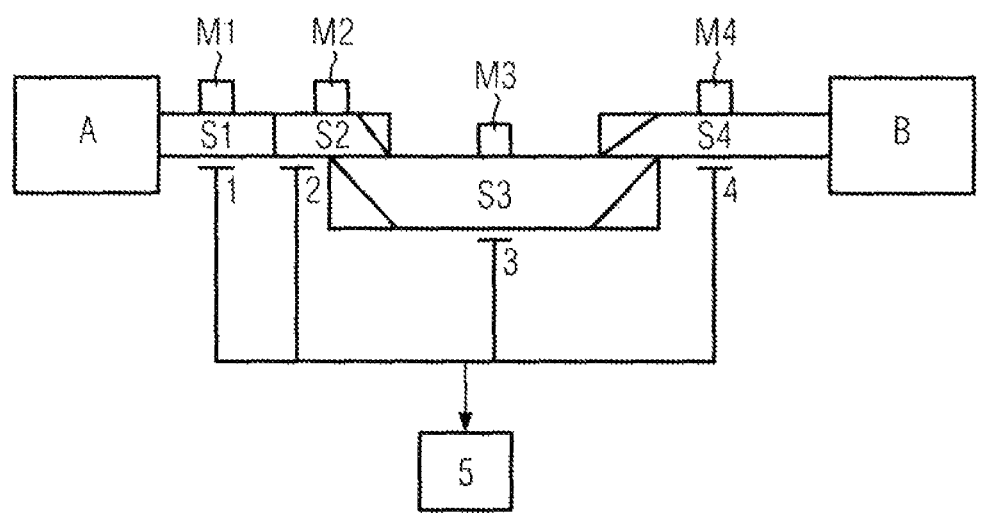
FIG. 1 schematically shows a transport device for containers with several sensors according to prior art.
Figure 2:
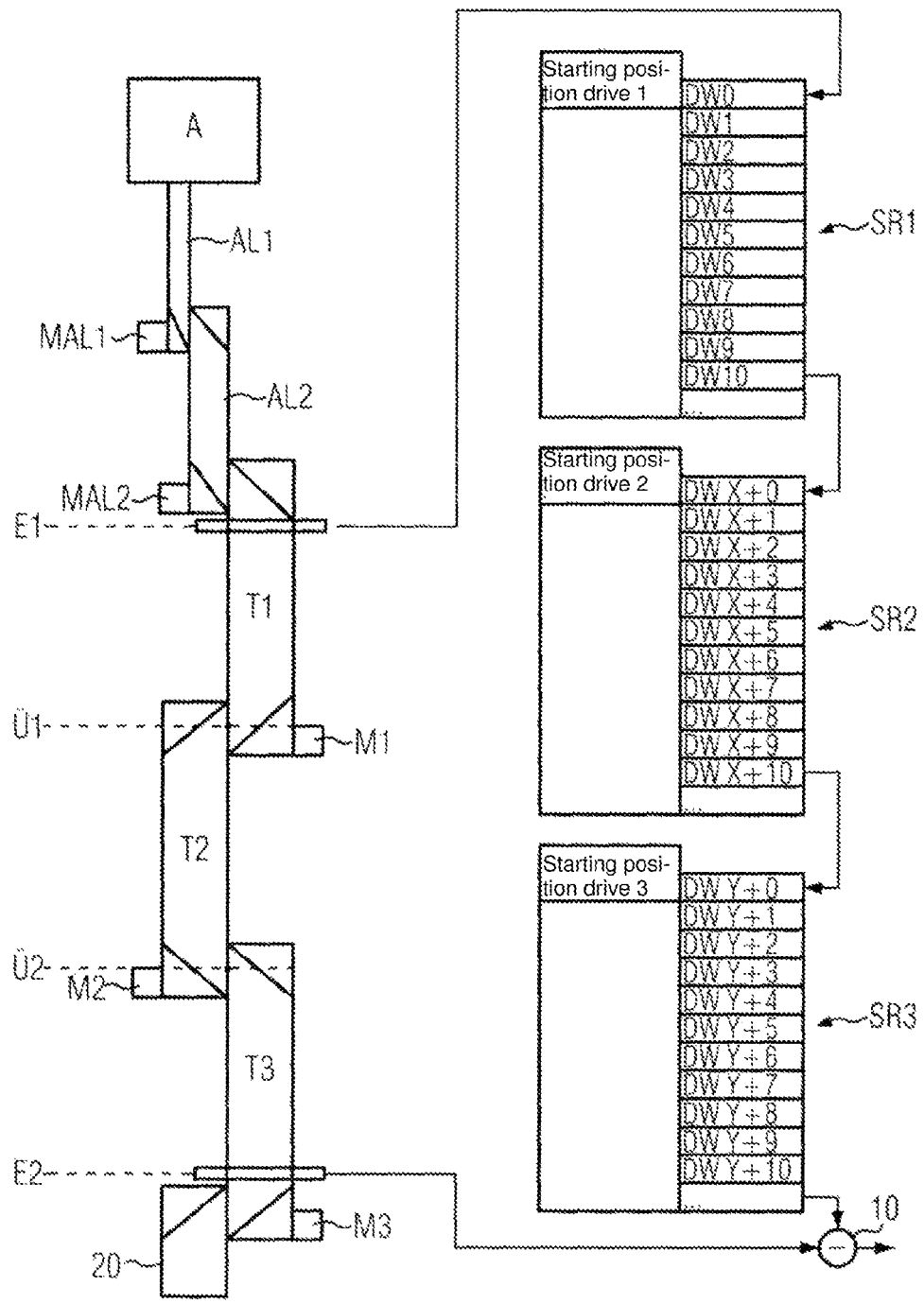
FIG. 2 schematically shows a transport device by which the method according to the present disclosure is carried out.

FIG. 2 schematically shows a typical arrangement of a transport device by which the inventive method may be carried out. Reference numeral A designates a container treatment device which ejects a continuous flow of treated containers fed into a transport section. FIG. 2 shows, by way of example, a transport section with partial sections AL1, AL2, T1, T2, and T3 to illustrate the principle. However, the transport section may be assembled from any partial sections. The partial sections AL1, AL2, T1, T2, and T3 are independently driven by motors M1, M2, M3, M4, and M5 at individual speeds. The partial sections AL1 and AL2 are used, in the example of FIG. 2, for expanding the single-track outlet of machine A to a multi-track outlet. The subsequent transport section T1, T2, and T3 then serves, for example, for acceleration, buffering and/or deceleration of the containers before they are fed into a following container treatment device (not shown).

Figure 3:
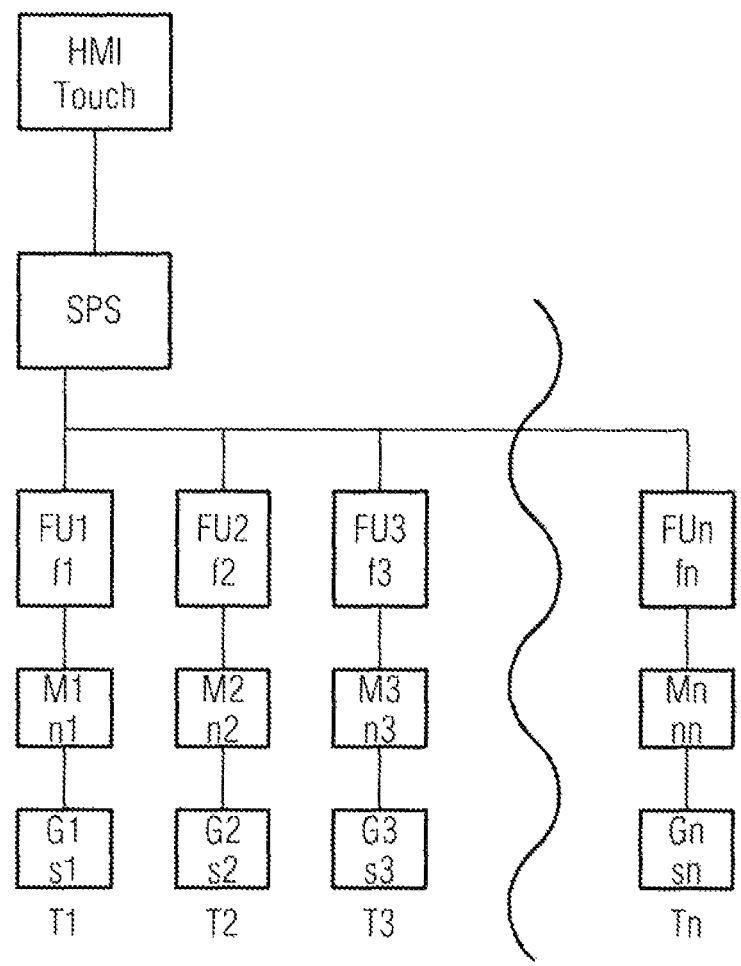
FIG. 3 shows a block diagram of a transport device for containers with n partial sections.

FIG. 3 shows a block diagram with the functional units of a transport section with n partial sections, T1, T2, T3 . . . Tn, wherein the partial sections T1, T2, and T3 may correspond to the partial sections T1, T2, and T3 of FIG. 2. Each partial section comprises a frequency converter FU1, FU2, FU3 . . . FUn, a motor M1, M2, M3 . . . Mn, and a gearing mechanism G1, G2, G3 . . . Gn. The frequency converter FU receives control signals of a stored program control (SPC) and generates a motor control signal of a certain frequency f1, f2, f3 . . . fn which is fed to the respectively associated motor M1, M2, M3 . . . Mn. The motor then rotates corresponding to the frequency at a corresponding driving speed n1, n2, n3 . . . nn. A gearing mechanism G1, G2, G3 . . . Gn is disposed at each motor and converts the rotary motion of the motor into a linear motion of the partial transport section T1, T2, T3 . . . Tn.

If $f_n$ is the frequency of the motor control signal for the partial section $T_n$, $P_n$ is the number of pairs of poles of the motor $M_n$, $Z_n$ is the number of teeth at the chain wheel for the partial section $T_n$, $K_n$ is the chain link distance per tooth engagement for the partial section $T_n$, and $I_n$ is the gear ratio, one obtains the conveying speed for the partial section $T_n$:

$$S_n = f_n \times 60 \times Z_n \times K_n / P_n \times I_n$$

For example, a frequency $f_n$ of 14.58 min$^{-1}$, a number of pairs of poles $P_n$ of 1, a number $Z_n$ of teeth at the chain wheel of 18, a chain link distance $K_n$ of 1 inch (2.54 cm), and a gear ratio $I_n$ of 40 lead to a belt speed $S_n$ of about 10 m/min.

Referring again to FIG. 2, reference numeral E1 designates a region in which a sensor, for example a camera or a light barrier, detects a belt loading of the partial transport section T1. The resulting value is fed into the first storage cell DW0 of a shift register SR1. A clock signal applied to the shift register causes each shift register content to be shifted to the next cell, for example with a rising edge of a clock signal. If the clock signal of the shift register is synchronized with the belt speed, for example the partial transport section T1, the content of a register in the shift register SR1 corresponds to a belt loading of a certain place on the partial transport section T1. The clock length of the clock signal then corresponds to a certain path length on the partial transport section T1.

In the above mentioned numerical example, a frequency $f_1$ of the motor control signal of 14.58 min$^{-1}$ corresponds to a belt speed $S_1$ of 10 m/min. If the contents of a storage cell of the shift register is to represent a belt loading of a length of 10 cm, a shift register clock must be triggered every 0.01 minutes, i.e. every 600 ms. If, for example, a system clock of 100 ms is used, every sixth period of the system clock, a trigger signal must be emitted as shift register clock signal. This means that the belt will move forward by 10 cm every 600 ms. If the belt loading is measured every 600 ms at point E1 over a length of 10 cm, and if each measurement is fed into the shift register SR1 with a shift register clock of 600 ms (corresponding to 1.66 Hz), a certain register content of the shift register SR1 corresponds at each point in time to a belt loading over a section of 10 cm at a fixed point of the partial transport section T1. If the conveying speed is changed, the shift register clock signal must be correspondingly also changed.

As an alternative, the shift register clock may be derived from the frequency $f_1$ of the motor control signal applied to the motor M1 of the partial section T1. For example, the frequency $f_1$, which was multiplied by a multiplier, may be used as shift register clock. Thereby, the shift register clock is automatically adapted to the conveying speed.

If a partial section is followed by a further partial section T2 with the same conveying width, for example for buffering, where the subsequent partial section T2 has a different conveying speed, the belt conveyor movement may be simulated by associating a second shift register SR2 with the second partial section T2 with a shift register clock which is synchronized with the conveying speed of the second partial section T2. The transfer point Ü1 from the partial section T1 to the partial section T2 is simulated by shifting the register contents of the last register DW10 in the first shift register SR1 to the first register DWX+0 in the following shift register SR2. In the process, the register contents of the registers DW10 and DWX+0 are added. If the belt speed of the second partial section T2 is higher than the belt speed of the first partial section T1, the register contents of the first register DWX+0 in the shift register SR2 is zero, so that the mean loading density is reduced over several register cells or belt sections of 10 cm. If the speed in the second partial section T2 is smaller than in the first partial section T1, a content is still contained in the first register DWX+0, and loading density is increased. An overflow depending on the conveying width takes place. In the next pulsing, the overflow will then remain in the first register DWX+0. With a changed conveying width T2, the overflow is correspondingly corrected in the shift registers.

If on a partial section, the container speed is smaller than the belt speed, a retroactive overflow also takes place in the register cells. Here, calculation takes place successively from the register cell DWXn to DWXn−1.

With more than two partial sections, for example an additional partial section T3, the number of shift registers correspondingly increases. FIG. 2 shows, for example, in addition the third shift register SR3 corresponding to the partial section T3.

Optionally, a further measurement may be performed in an outgoing region of the transport section E2, for example with a CCD camera or a 3D camera. The resulting measured value may be compared to the register content of the last register DWY+10 of the last shift register SR3, for example by subtraction 10. If the difference is not equal 0, a fault may be present and corresponding measures may be initiated.

The camera may also perform measurements in a system clock, that means a measurement may be performed every 100 ms according to the previously used numerical example. The value fed into the register cell DW0 is then determined by addition or averaging from 6 measurements according to the shift register clock.

The invention claimed is:

1. A method for monitoring and controlling a loading rate of a transport section with several individually speed-controlled consecutive partial sections (T1, T2, T3) in a filling line, comprising:
   detecting a container loading over a certain region at an incoming region (E1) of said transport section;
   simulating a container flow in real time using the detected container loading in the incoming region of the transport section and a transport speed,
   the simulation comprising:
   entering said detected value for the container loading into a shift register (SR1); and
   synchronizing a shift register clock with the transport speed, so that the shift register content (DW0, DW1, ... ) represents the container loading on the transport section.

2. The method according to claim 1, and in simulating the container flow,
   associating a path section on the partial transport section (T1, T2, T3) with the shift register clock depending on transport speed.

3. The method according to claim 1, and calculating at least one of a container loading or a container distance from the shift register contents (DW0, DW1, ... ).

4. The method according to claim 1, and calculating a container throughput from the shift register contents (DW0, DW1, ... ) and the transport speeds of the partial sections.

5. The method according to claim 1, and controlling the transport speeds of the partial sections (T1, T2, T3) such that at least one of a given container throughput, a given container loading or a given container distance is achieved.

6. The method according to claim 1, and visualizing at least one of the loading of the transport section or its change in time.

7. The method according to claim 1, and simulating a virtual back pressure switch.

8. The method according to claim 7, and in simulating the virtual back pressure switch, the virtual back pressure switch changes the transport speed of one or several partial sections, such that the loading density falls below a predetermined value corresponding to a predetermined storage cell of a shift register.

9. The method according to claim 1, and detecting the container loading over a certain region at an outgoing region (E2) of the transport section which is preferably arbitrarily selectable.

10. The method according to claim 1, and in entering the detected value for the container loading, the shift register comprises a plurality of differently clocked shift registers (SR1, SR2, SR3) corresponding to the number of partial sections (T1, T2, T3), and further comprising synchronizing the clocks of the differently clocked shift registers (SR1, SR2, SR3) with the transport speeds of the partial sections (T1, T2, T3).

11. The method according to claim 10, further comprising:
calculating a virtual representation of a container loading at a transfer point (Ü1, Ü2) by calculating a virtual position and an arrival time of one or several containers at the transfer point (Ü1, Ü2), and
shifting the virtual representation at the transfer point (Ü1, Ü2) to a following shift register of the subsequent partial section of the transport section.

12. The method according to claim 10, wherein during a shift from a last storage cell (DW10) of a preceding shift register (SWR1), storage content of the last storage cell (DW10) is added to the storage content of a first storage cell (DWX+0) of a subsequent shift register (SWR2) to simulate a transfer from a partial section (T1) to a subsequent partial section (T2).

13. The method according to claim 1, and in detecting the container loading,
cyclically detecting the container loading at the incoming region of the transport section over a path section corresponding to the shift register clock.

14. The method according to claim 13, wherein the container loading is detected with a camera.

15. The method according to claim 13, wherein the container loading is detected on a single-track partial section with a light barrier.

\* \* \* \* \*